United States Patent
Miller

[11] Patent Number: 6,068,027
[45] Date of Patent: May 30, 2000

[54] PIPELINE INSULATION

[75] Inventor: Keith Edmund James Miller, Maidenhead, United Kingdom

[73] Assignee: Seamark Systems Limited, West Lothian, United Kingdom

[21] Appl. No.: 09/142,468

[22] PCT Filed: Mar. 6, 1997

[86] PCT No.: PCT/GB97/00630

§ 371 Date: Nov. 18, 1998

§ 102(e) Date: Nov. 18, 1998

[87] PCT Pub. No.: WO97/33122

PCT Pub. Date: Dec. 9, 1997

[30] Foreign Application Priority Data

Mar. 6, 1996 [GB] United Kingdom .................. 9604765
Dec. 12, 1996 [GB] United Kingdom .................. 9625830

[51] Int. Cl.⁷ ............................................ F16L 9/14
[52] U.S. Cl. ......................... 138/149; 138/140; 138/175; 405/171
[58] Field of Search .................................. 138/149, 140; 405/171, 172, 16, 19, 20

[56] References Cited

U.S. PATENT DOCUMENTS

| | | | |
|---|---|---|---|
| 687,389 | 11/1901 | Wilhelmi | 405/19 |
| 1,772,821 | 8/1930 | Weber | 405/172 |
| 2,315,837 | 4/1943 | Brown et al. | 96/26 |
| 4,228,826 | 10/1980 | Campbell, Jr. | 138/149 |
| 4,240,994 | 12/1980 | Ottenholm | 264/26 |
| 4,252,767 | 2/1981 | Piazza et al. | 264/256 |
| 4,290,457 | 9/1981 | Campbell, Jr. | 138/149 |
| 4,477,206 | 10/1984 | Papetti et al. | 405/19 X |
| 4,573,400 | 3/1986 | Foy | 138/149 X |
| 4,640,312 | 2/1987 | Patell et al. | 138/109 |
| 5,722,795 | 3/1998 | Angel et al. | 405/172 |
| 5,846,023 | 12/1998 | Angel et al. | 405/20 X |

FOREIGN PATENT DOCUMENTS

| | | |
|---|---|---|
| 1337394 | 11/1973 | United Kingdom . |
| 2159912 | 11/1985 | United Kingdom . |
| 2255610 | 11/1992 | United Kingdom . |

*Primary Examiner*—Patrick Brinson
*Attorney, Agent, or Firm*—Watson Cole Grindle Watson, P.L.L.C.

[57] ABSTRACT

An insulation blanket for a pipeline, comprising at least one insulating cell, wherein the or each insulating cell comprises a protective layer and an insulating layer.

34 Claims, 4 Drawing Sheets

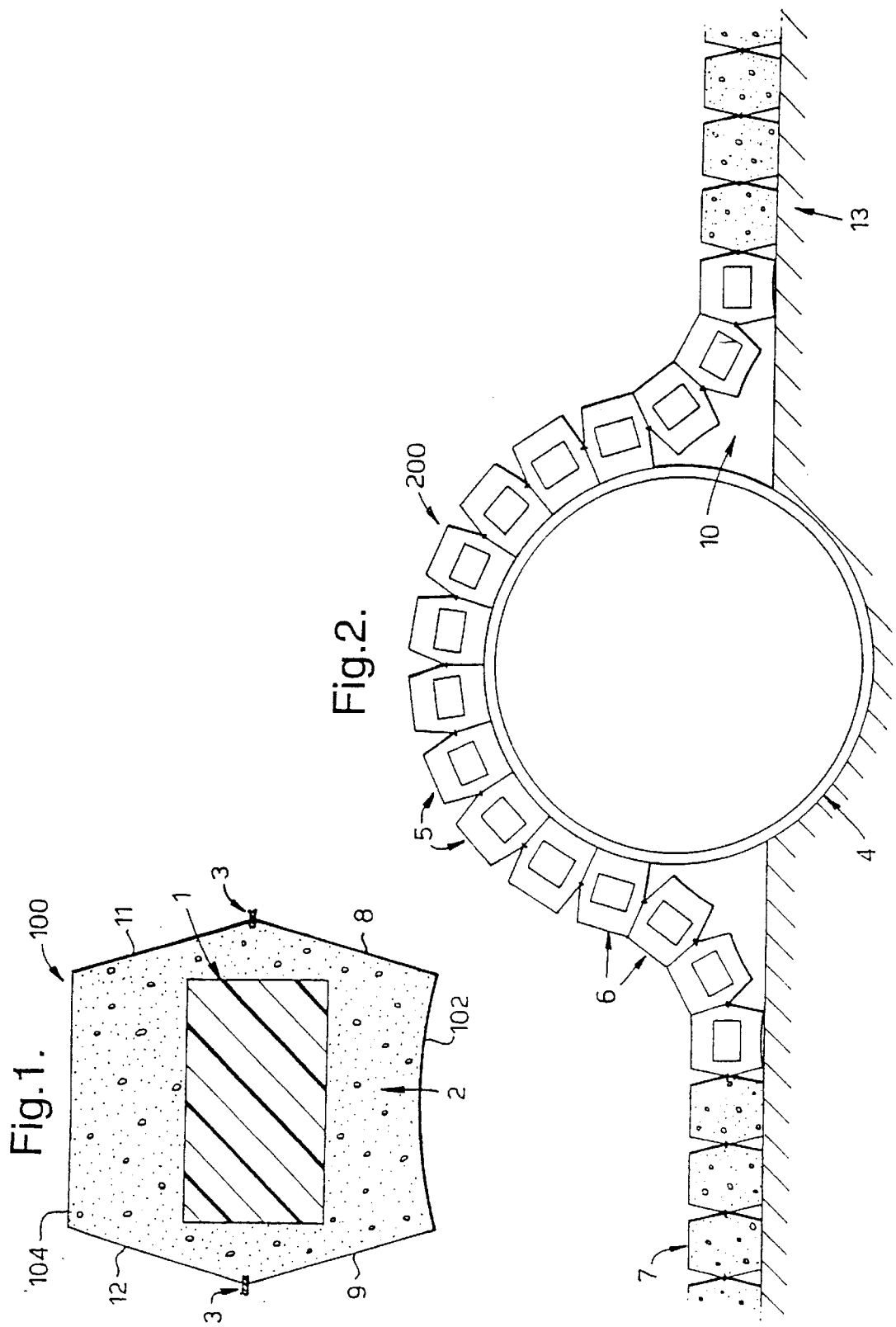

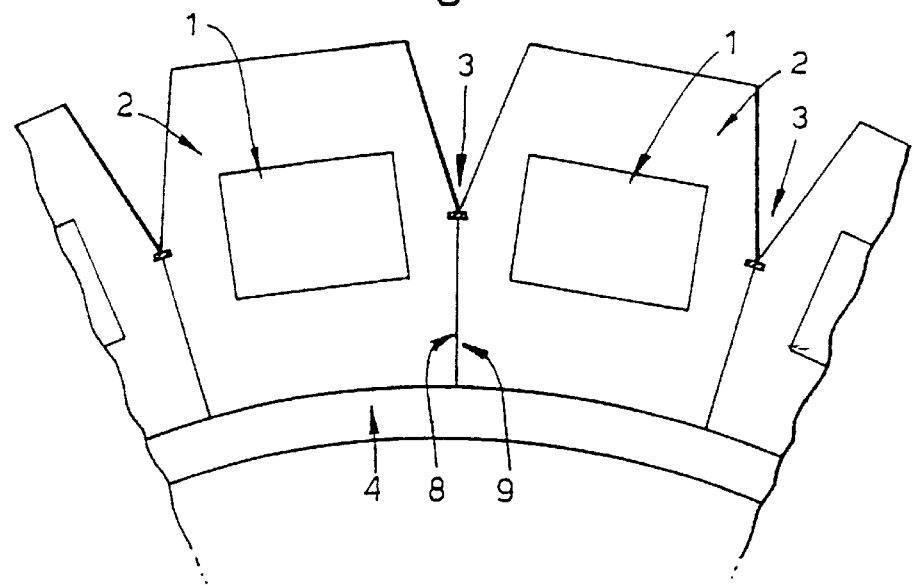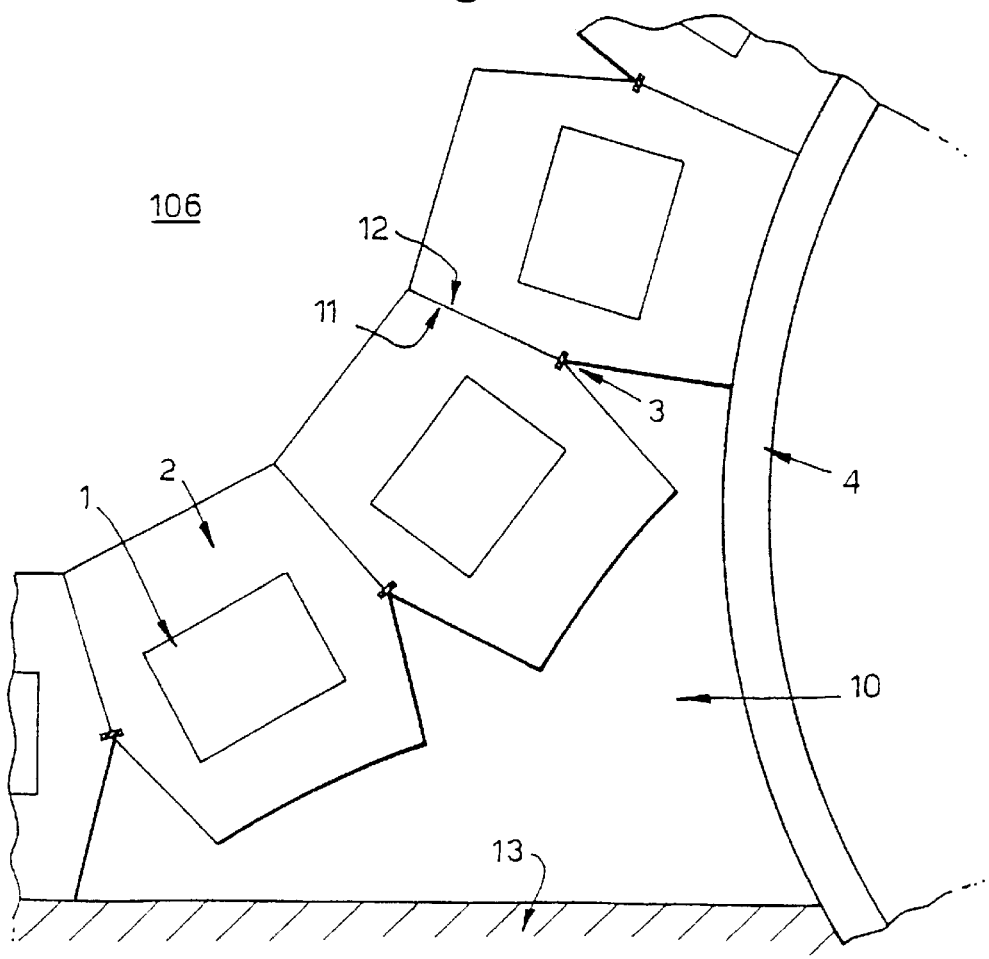

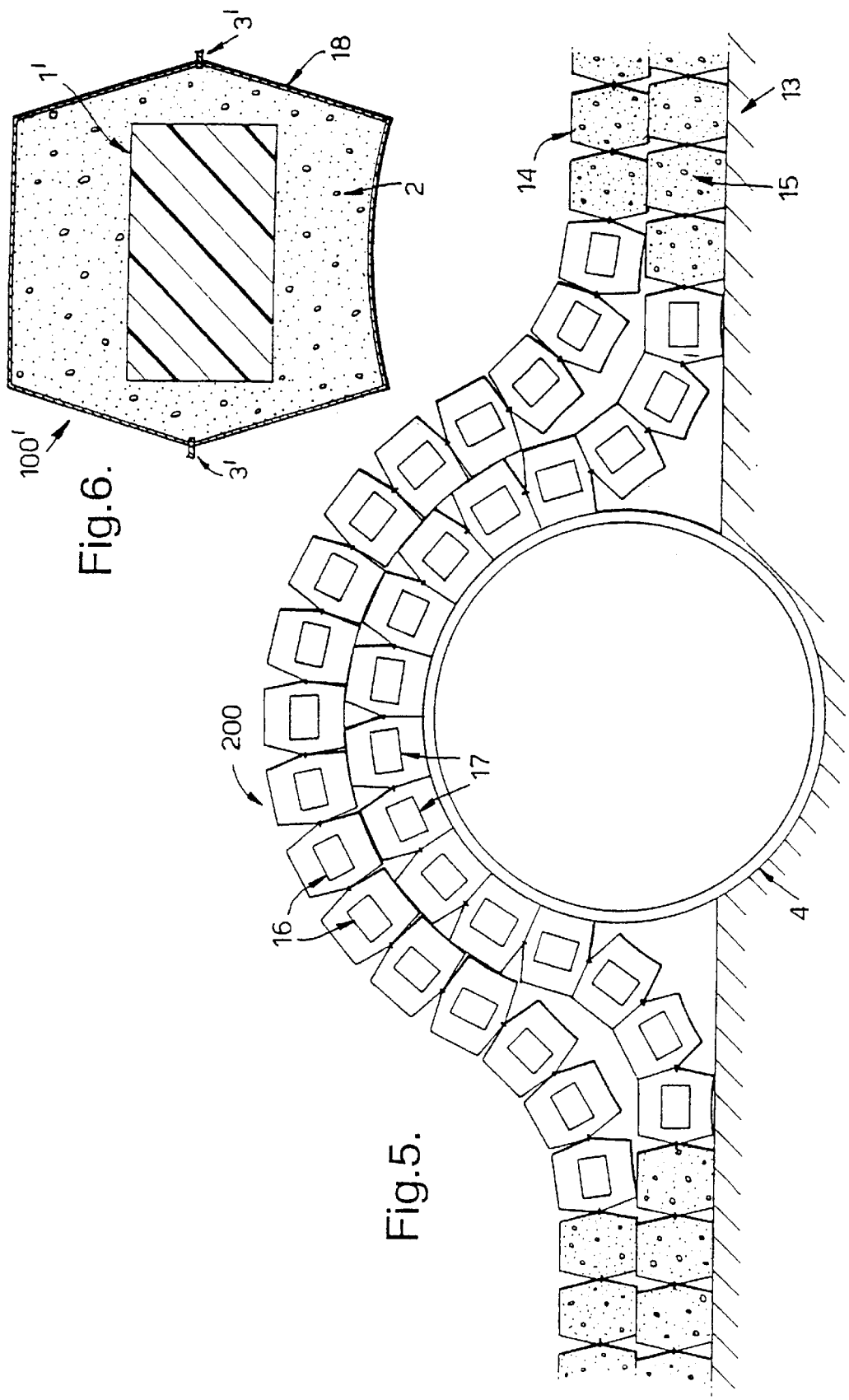

PIPELINE INSULATION

This invention relates to pipeline insulation. More particularly, the invention relates to a pipeline insulation blanket, and to an insulating cell for a pipeline insulation blanket.

It is often desirable to provide insulation for undersea pipeline lying on the seabed in order to prevent heat loss. This heat loss can lead to an undesirable cooling of the fluids being transported through the pipeline. There are a number of known techniques for insulating existing or planned pipeline.

We have now found a way to provide effective insulation for a pipeline, which is cost effective to manufacture and which is easy to handle and install.

According to one aspect of the present invention we provide an insulation blanket for a pipeline, comprising at least one insulating cell, wherein the or each insulating cell comproses a protective layer and an insulating layer. The protective layer is suitably concrete, preferably high strength concrete.

The protective layer provides the rigidity to hold to blanket together, ie, it provides reinforcement for the blanket. In addition, the protective layer can protect the insulating layer from the conditions prevailing on the seabed, such as high pressure, and can protect the insulating layer from the ingress of Seawater. In the North Sea the pressure would typically be in the range 10 to 20 bar, while in the Gulf of Mexico the pressure could be up to 50 bar. The insulating layer provides the necessary insulation for the blanket.

The protective layer will usually be much denser than the insulating layer, thereby providing sufficient ballast for the blanket: typically the protective layer will have a density greater than 1.5 tonnes per cubic meter, and the insulating layer will have a density less than 0.1 tonnes per cubic meters. The density of the protective layer would usually be less than 2.0 tonnes per cubic meter, and the density of the insulating layer would usually be less than 2.0 tonnes per cubic meter.

The insulating layer is a material having a low thermal conductivity, which is preferably in the range 0.015 to 0.04 W/mK, more preferbly 0.022 to 0.039 W/mK. An example of a suitable insulating material is polystyrene foam. The thickness of the layer of concrete surrounding the insulating layer is desirably in the range 20 to 40mm, and may be in the range 20 to 30 mm.

The or each insulating cell may be provided with more than one of said insulating layers and/or with more than one of said protective layers.

Preferably the or each cell has an outer layer of a water impermeable material.

In a preferred embodiment the or each cell has the general shape of a hexagonal prism, ie a prism in which the two end faces are shaped like a hexagon. The or each cell may be interconnected along two opposite longitudinal edges of the prism.

The or each insulating cell can be suitably shaped, so that the pipeline insulation blanket can surround at least part of the pipeline.

In one embodiment, a plurality of the insulating cells are secured to one another by a flexible connector, in order to provide an articulated structure; this enables adjacent cells to pivot relative to one another. A gasket or other impermeable material may be provided in the axis of the flexible connector to help prevent water from flowing between adjacent cells. This helps to reduce heat losses.

In another embodiment, each insulating cell may comprise a segment of a circle, and the inner surface of each cell (ie the surface that corresponds to the innermost part of the segment of the circle) may be shaped to conform to the shape of the pipeline to which it is to be fitted. The blanket composes a sufficient number of the cells connected together to surround the pipeline completely. For example, if each cell corresponds to the segment of a third of a circle, then the blanket will comprise three cells. This embodiment is particularly useful when the blanket is to be installed at the same time as the pipeline.

In a further embodiment, a single insulating cell is adapted to surround the periphery of the pipeline completely; thus, for a cylindrical pipe the insulating cell can be provided with a cylindrical inner bore, which receives the pipeline.

A single blanket is adequate for many purposes, but it may be desirable to provide a pipeline insulation structure comprising two or more of the blankets arranged one on top of the other and/or arranged in juxtaposition. In this embodiment, it is preferred that the cells of adjacent blankets are offset relative to one another.

In most practical situations, the length of the pipeline will be quite long relative to the size of the insulating cells, so it will usually be necessary to arrange a plurality of insulating blankets, side by side, along the length of the pipe.

According to another aspect of the invention there is provided an insulating cell for a pipeline insulation blanket, comprising a protective layer at least partially surrounding an insulating layer. As described above, the insulating layer is advantageously completely surrounded by the protective layer, and the protective layer is suitably concrete, preferably high strength concrete. The insulating cell according to this aspect of the invention may be provided with any combination of the features of the insulating cell described above with reference to the pipeline insulation blanket.

In one embodiment, the insulating cell is provided with a bore adapted to receive the pipeline therein, whereby the cell can completely surround the pipeline. Typically the bore will be cylindrical, so that it can receive a substantially cylindrical pipeline therein; the outer surface of the bore is also usually cylindrical. The diameter of the bore is preferably slightly larger than the outer diameter of the pipeline, so that the insulating cell is a close fit for the pipeline.

In this embodiment, the insulating cell can be made by forming an inner layer of the protective material; forming a layer of the insulating material on the outer surface of said inner layer; and forming an outer layer of the protective material on the outer surface of said insulating layer.

Reference is now made to the accompanying drawings, in which:

FIG. 1 is a front elevation of an embodiment of an insulating cell according to the invention;

FIG. 2 is a front elevation of an embodiment of a pipeline insulation blanket according to the invention, in position on a pipeline;

FIG. 3 is a section of part of the pipeline insulation blanket shown in FIG. 2, on an enlarged scale;

FIG. 4 is a section of another part of the pipeline insulation blanket shown in FIG. 2, on an enlarged scale;

FIG. 5 is a front elevation of a pipeline insulation system comprising two pipeline insulation blankets;

FIG. 6 is a front elevation of another embodiment of an insulating cell according to the invention;

Figure 7:
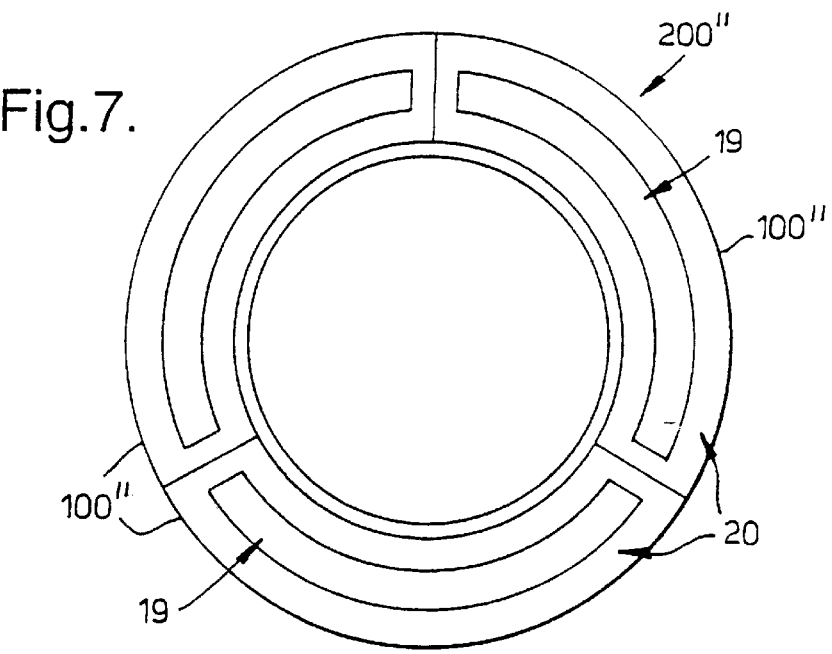
FIG. 7 is a front elevation of a further embodiment of a pipeline insulation blanket according to the invention.

Referring to FIG. 1, an insulating cell generally designated 100 comprises an insulating layer 1 sandwiched within an impermeable outer concrete layer 2. An interconnection means in the form of a rope 3 is provided on opposite sides of the cell 100, and enables the cell 100 to be secured to two other cells. The flexible nature of the rope 3 provides an articulation between adjacent cells, thereby enabling the cell 100 to move relative to adjacent cells, as will be discussed in more detail below. The cell 100 has the general shape of a hexagonal prism, and includes a curved lower surface 102, an upper surface 104, two opposite lower side surfaces 8 and 9, and two opposite upper side surfaces 11 and 12.

FIG. 2 shows a plurality of the cells 100 secured together by rope 3 to form an insulation blanket 200, which is draped over a pipeline 4 resting on a seabed 13.

It will be clear that the cells 100 of the blanket 200 can be disposed in two distinct configurations. The first configuration is known as the "over-bend" configuration, and reference numeral 5 in FIG. 2 designates two cells 100 that are in this configuration. The cells 100 that rest on the pipeline 4 are in the over-bend configuration: this is shown in more detail in FIG. 3. The geometry of the cells 100 is such that when they are in the over-bend configuration the surfaces 8 and 9 of adjacent cells fit tightly together in engagement with one another, so that there is no significant path between the cells for heat to escape to an environment 106 outside the blanket 200. The rope 3 permits the adjacent cells 100 to move in order to bring the surfaces 8 and 9 into engagement. The lower surface 102 is shaped to conform with the outer surface of the pipeline 4.

The second configuration is known as the "sag-bend" configuration, and reference numeral 6 in FIG. 2 designates two cells 100 that are in this configuration. The cells 100 that hang between the pipeline 4 and the seabed 13 are in the sag-bend configuration: this is shown more clearly in FIG. 4. The geometry of the cells 100 is such that when they are in the sag-bend configuration the surfaces 11 and 12 of adjacent cells 100 fit tightly together in engagement with one another, so that there is no significant path for heat to escape between the cells 100 to the environment 106 outside the blanket 200. The rope 3 permits the adjacent cells 100 to move in order to bring the surfaces 11 and 12 into engagement. It will be apparent from FIG. 4 that there is a void 10 of water trapped between the seabed 13, the pipeline 4 and the blanket 200. The engagement of the surfaces 11 and 12 restricts or prevents water flow between the void 10 and the outside environment 106, so that the water in the void 10 cannot leave by convection, and remains adjacent to the pipeline 4.

It will be appreciated that the sag-bend and over-bend configurations represent two extreme positions of the blanket 200, and that the cells 100 can adopt intermediate configurations. For example, the outer cells 100 of the blanket 200, which rest on the seabed 13, adopt an intermediate configuration: one of these outer cells is designated by the reference numeral 7 in FIG. 2. The outer cells 100 provide additional stability and enhance the resistance of the blanket 200 to hazards such as trawl board strike, and strong undersea currents caused by storms and other extreme environmental conditions. The outer cells need not comprise the insulating cells 100; for example, they may be formed entirely of concrete.

FIG. 5 shows a pipeline insulation system comprising an upper insulating blanket 14 laid on top of a lower insulating blanket 15. The blankets 14 and 15 may be identical to the blanket 200 shown in FIGS. 1 to 4. The insulating cells of the upper blanket 14 are designated 16 and the insulating cells of the lower blanket 15 are designated 17. The blankets 14 and 15 are arranged so that the cells 16 are offset relative to the cells 17. This offset arrangement helps to minimise heat losses.

FIG. 6 shows an alternative embodiment of cell, which is generally designated 100'. The cell 100' comprises an insulation layer 1' sandwiched within an outer concrete layer 2'. An interconnection means in the form of a rope 3' is provided on opposite sides of the cell 100', and enables the cell 100' to be secured to two other cells. The flexible nature of the rope 3' enables the cell 100' to move relative to adjacent cells. The concrete layer 2' is completely surrounded by an outer layer 18 which provides a water impermeable barrier.

FIG. 7 shows an alternative embodiment of a pipeline insulation blanket, which is generally designated 200", and comprises three insulation cells 100". Each cell 100" comprises an insulation layer 19 sandwiched between an impermeable outer concrete layer 20. Each cell 100" forms one third of a segment of a circle, so that three cells 100" can be secured together to form the blanket 200", which surrounds the pipeline 4 completely. The cells 100" can be secured together by adhesive, banding or any other known means. It will be appreciated that the cells 100" may be made to any desired segment of a circle, so that the blanket 200" may be formed of two, four, or more cells 100". The blanket 200" is most useful when it is desired to install an insulation blanket at the same time as installing the pipeline 4.

Figure 8:
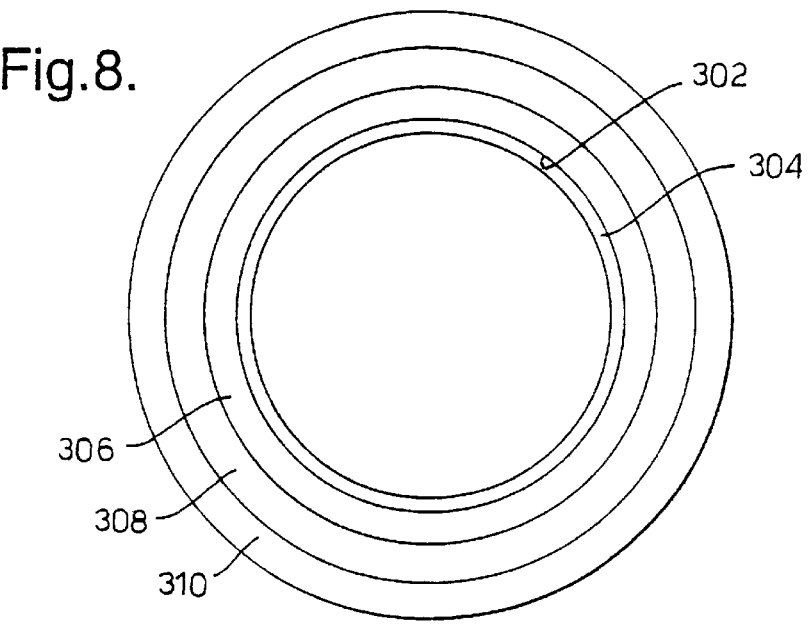
FIG. 8 is a front elevation of a further embodiment of a pipeline insulating cell according to the invention.
Figure 9:
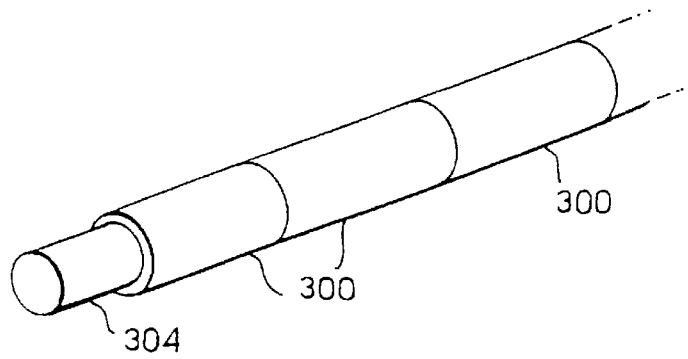
FIG. 9 is a perspective view, on a reduced scale, showing several of the pipeline insulating cells of FIG. 8 in position on a pipeline.

FIG. 8 shows an alternative embodiment of insulating cell, generally designated 300. The cell 300 has a cylindrical shape with a central bore 302 for receiving a pipeline 304. The cell 300 is made up of an inner protective layer 306, an insulating layer 308 provided on the outer surface of the inner protective layer 306, and an outer protective layer 310 provided on the outer surface of the insulating layer 308. FIG. 9 shows a plurality of the insulating cells 300 arranged side by side along the length of the pipeline 304, thereby forming a pipeline insulation blanket.

Whilst certain embodiments of the invention have been described above, it will be appreciated that the invention may be modified.

What is claimed is:

1. An insulation blanket for a pipeline, comprising at least one insulating cell, wherein the at least one insulating cell comprises at least one protective layer and an insulating layer.

2. An insulation blanket according to claim 1, wherein the insulating layer is completely surrounded by the at least one protective layer.

3. An insulation blanket according to claim 1, wherein the at least one protective layer is concrete.

4. An insulation blanket according to claim 1, wherein the insulating layer has a thermal conductivity in the range 0.015 to 0.04 W/mK.

5. An insulation blanket according to claim 1, wherein the insulating layer has a thermal conductivity in the range 0.022 to 0.039 W/mK.

6. An insulation blanket according to claim 1, wherein the thickness of the insulating layer is in the range 20 to 40 mm.

7. An insulation blanket according to claim 1, wherein the at least one protective layer is denser than the insulating layer.

8. An insulation blanket according to claim 1, wherein the at least one protective layer has a density greater than 1.5 tonnes per cubic meter, and the insulating layer has a density less than 0.1 tonnes per cubic meters.

9. An insulation blanket according claim 1, wherein the at least one insulating cell has an outer layer of a water impermeable material.

10. An insulation blanket according to claim 1, comprising at least two of said insulation cells.

11. An insulation blanket according to claim 10, wherein adjacent cells are secured to one another by means of a flexible connector.

12. An insulation blanket according to claim 10, wherein each insulating cell comprises a segment of a circle, and an inner surface of each cell is shaped to conform to the shape of the pipeline to which it is to be fitted.

13. An insulation blanket according to claim 12, wherein a sufficient number of the cells are connected together to surround the pipeline completely.

14. An insulation blanket according to claim 1, wherein the at least one insulation cell has a bore therethrough that is adapted to receive at least part of the pipeline therein.

15. An insulating cell for pipeline insulation blanket, comprising a protective layers at least partially surrounding an insulating layer; said protective layer being sufficiently rigid to protect the insulating layer from water pressure of 10 bar.

16. A pipeline insulation structure comprising a plurality of pipeline insulation blankets, each of said plurality of blankets being an insulation blanket according to claim 1, said plurality of pipeline insulation blankets being juxtaposed and/or being laid one top of another.

17. An insulation blanket for a subsea pipeline, comprising at least one insulating cell, wherein the at least one insulating cell comprises at least one protective layer, and an insulating layer which is completely surrounded by the at least one protective layer, and wherein the at least one protective layer is sufficiently rigid to protect the insulating layer from water pressures of 10 bar prevailing on the seabed.

18. An insulation blanket according to claim 17, wherein the at least one protective layer is sufficiently rigid to protect the insulating layer from water pressure of 20 bar prevailing on the seabed.

19. An insulation blanket according to claim 17, wherein the at least one protective layer is sufficiently rigid to protect the insulating layer from water pressures of 50 bar prevailing on the seabed.

20. An insulation blanket according to claim 17, wherein the at least one protective layer is concrete.

21. An insulation blanket according to claim 17, wherein the insulating layer has a thermal conductivity in the range of 0.015 to 0.04 W/mK.

22. An insulation blanket according to claim 17, wherein the insulating layer has a thermal conductivity in the range of 0.022 to 0.039 W/mK.

23. An insulation blanket according to claim 17, wherein the thickness of the insulating layer is in the range of 20 to 40 mm.

24. An insulation blanket according to claim 17, wherein the at least one layer is denser than the insulating layer.

25. An insulation blanket according to claim 17, wherein the at least one protective layer has a density greater than 1.5 tonnes per cubic meter, and the insulating layer has a density less than 0.1 tonnes per cubic meter.

26. An insulation blanket according to claim 17, wherein the at least one insulating cell has an outer layer of a water impermeable material.

27. An insulation blanket according to claim 17, comprising at least two of said insulating cells.

28. An insulation blanket according to claim 27, wherein said at least two insulating cells adjacent one another and are secured to one another by means of a flexible connector.

29. An insulation blanket according to claim 17, wherein the at least one protective layer of the at least one insulating cell has a concave surface shaped to match part of the external surface of the pipeline.

30. An insulation blanket according to claim 27, wherein each of said at least one insulating cells comprises a segment of a circle, and an inner surface of each of said at least one insulating cells are shaped to conform to the shape of the pipeline to which it is to be fitted.

31. An insulation blanket according to claim 26, wherein a sufficient number of the at least one insulating cells are connected together to surround the pipeline completely.

32. An insulation blanket according to claim 17, comprising a single insulating cell which is adapted to surround the periphery of the pipeline completely.

33. An insulation blanket according to claim 32, wherein the at least one insulating cell has a bore therethrough that is adapted to receive at least part of the pipeline therein.

34. An insulation blanket according to claim 32, wherein the at least one insulating cell is substantially cylindrical, and two of said protective layers are provided in substantially cylindrical form, such that the insulating layer is sandwiched between said two protective layers.

* * * * *

UNITED STATES PATENT AND TRADEMARK OFFICE
CERTIFICATE OF CORRECTION

PATENT NO.   : 6,068,027
DATED        : May 30, 2000
INVENTOR(S)  : Keith Edmund James Miller It is certified that error appears in the above-identified patent and that said Letters Patent is hereby corrected as shown below:

Column 4, claim 1,
Line 41, correct to read as follows:
1. An insulation blanket for a pipeline, comprising at least one insulating cell, wherein the at least one insulating cell comprises at least one protective layer and an insulating layer; said at least one insulating cell is adapted to surround the periphery of the pipeline completely; and the insulating cell is substantially cylindrical, and two of said protective layers are provided in substantially cylindrical form, such that the insulating layer is sandwiched between said two protective layers.

Signed and Sealed this

Thirteenth Day of November, 2001

Attest:

NICHOLAS P. GODICI
Attesting Officer    Acting Director of the United States Patent and Trademark Office